United States Patent
Sugiyama et al.

(10) Patent No.: US 10,830,624 B2
(45) Date of Patent: Nov. 10, 2020

(54) GAS METER

(71) Applicant: Panasonic Intellectual Property Management Co., Ltd., Osaka (JP)

(72) Inventors: Masaki Sugiyama, Kyoto (JP);
Hideaki Morihana, Nara (JP);
Hidetomo Nagahara, Kyoto (JP);
Yuuji Nakabayashi, Nara (JP); Hideki Kinoshita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 16/074,479

(22) PCT Filed: Dec. 14, 2016

(86) PCT No.: PCT/JP2016/005125
§ 371 (c)(1),
(2) Date: Aug. 1, 2018

(87) PCT Pub. No.: WO2017/149576
PCT Pub. Date: Sep. 8, 2017

(65) Prior Publication Data
US 2019/0041250 A1    Feb. 7, 2019

(30) Foreign Application Priority Data

Feb. 29, 2016   (JP) ................................. 2016-036759

(51) Int. Cl.
*G01F 5/00*    (2006.01)
*G01F 15/14*   (2006.01)
(Continued)

(52) U.S. Cl.
CPC ................ *G01F 5/00* (2013.01); *G01F 1/662* (2013.01); *G01F 1/667* (2013.01); *G01F 3/225* (2013.01); *G01F 15/14* (2013.01)

(58) Field of Classification Search
CPC . G01F 5/00; G01F 1/662; G01F 1/667; G01F 15/14; G01F 3/225
See application file for complete search history.

(56) References Cited

U.S. PATENT DOCUMENTS

2010/0064821 A1    3/2010 Nakabayashi et al.
2010/0192702 A1    8/2010 Satou et al.
(Continued)

FOREIGN PATENT DOCUMENTS

CN    104704328    6/2015
EP    2869038      5/2015
(Continued)

OTHER PUBLICATIONS

English translation of Chinese Search Report dated Aug. 1, 2019 in corresponding Chinese Patent Application No. 201680082728.0.
(Continued)

*Primary Examiner* — David Z Huang
(74) *Attorney, Agent, or Firm* — Wenderoth, Lind & Ponack, L.L.P.

(57) ABSTRACT

A gas meter includes a meter entrance that allows a fluid to flow in, a meter exit that allows the fluid to flow out, and a flow rate measurer that measures a flow rate of the fluid. In addition, the flow rate measurer includes a plurality of flow rate measuring units having the same shape and composed of a flow passage portion with a rectangular cross section shape on the outer side and a sensor portion disposed on one face of the flow passage portion. The plurality of flow rate measuring units are integrally configured by bonding faces (Continued)

having no sensor portion so as to serve as bonding faces of the flow rate measuring units.

6 Claims, 7 Drawing Sheets

(51) Int. Cl.
    *G01F 1/66* (2006.01)
    *G01F 3/22* (2006.01)

(56) References Cited

U.S. PATENT DOCUMENTS

| 2015/0253166 A1 | 9/2015 | Yasuda et al. |
| 2016/0370215 A1 | 12/2016 | Satou et al. |

FOREIGN PATENT DOCUMENTS

| EP | 2908103 | 8/2015 | | |
| JP | 2000-241219 | 9/2000 | | |
| JP | 2008-122106 | 5/2008 | | |
| JP | 2009-014672 | 1/2009 | | |
| JP | 2014-077679 | 5/2014 | | |
| JP | 2015-145827 | 8/2015 | | |
| JP | 2015-148529 | 8/2015 | | |
| WO | 2014/002473 | 1/2014 | | |
| WO | WO-2014057673 A1 * | 4/2014 | ............... | G01F 5/00 |
| WO | 2015/118823 | 8/2015 | | |

OTHER PUBLICATIONS

Extended European Search Report dated Dec. 17, 2019 in European Patent Application No. 16892421.5.

International Search Report of PCT application No. PCT/JP2016/005125 dated Mar. 7, 2017.

Extended European Search Report dated Feb. 13, 2019 in European Patent Application No. 16892421.5.

* cited by examiner

GAS METER

This application is a U.S. national stage application of the PCT International Application No. PCT/JP2016/005125 filed on Dec. 14, 2016, which claims the benefit of foreign priority of Japanese patent application No. 2016-36759 filed on Feb. 29, 2016, the contents all of which are incorporated herein by reference.

TECHNICAL FIELD

The present disclosure relates to a configuration of a gas meter in which a measuring unit measuring a flow rate of a gas is used, and particularly relates to a gas meter suitable for measuring a high flow rate.

BACKGROUND ART

Figure 9:
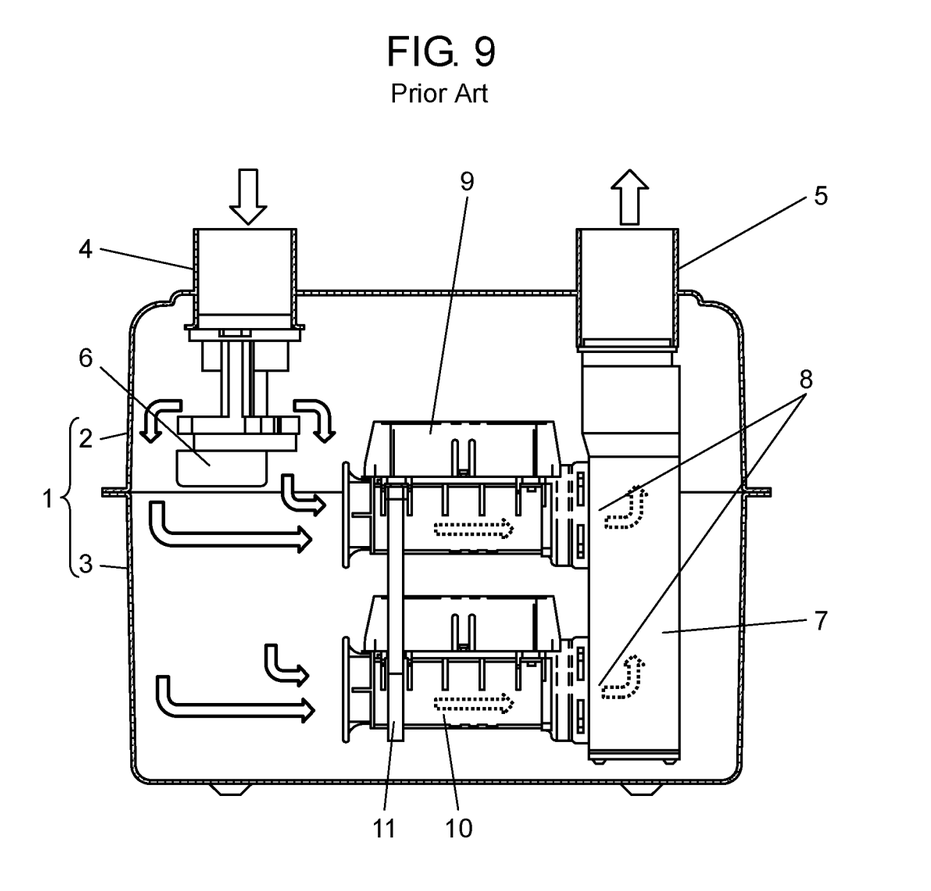
FIG. 9 is a sectional view schematically illustrating a gas meter of the related art.

In the related art, a gas meter illustrated in FIG. 9 is disclosed as this type of gas meter. In FIG. 9, gas meter 1 is configured with upper case 2 and lower case 3, which are formed by pressing a metal. Entrance pipe 4 and exit pipe 5 are disposed in an upper face of upper case 2, and entrance pipe 4 is open to an inside of gas meter 1 via shut-off valve 6. Connection pipe 7 is connected to exit pipe 5.

Mounting portions 8 are formed on upper and lower parts of connection pipe 7. Ultrasonic flow rate measuring unit 9 is connected to upper mounting portion 8, and flow passage member 10, which is formed to have the same flow passage shape as upper ultrasonic flow rate measuring unit 9, is connected to lower mounting portion 8. Ultrasonic flow rate measuring unit 9 and flow passage member 10 are fixed to mounting portions 8 by a fixing metal fitting (not illustrated).

An ultrasonic flow rate measuring unit from which a mechanism for measuring a flow rate is removed is included as flow passage member 10. The flow passage member is configured such that a gas flows at the same flow rate as in ultrasonic flow rate measuring unit 9, and a total flow rate (in this case, estimated to be twice the flow rate measured by ultrasonic flow rate measuring unit 9) can be measured based on the flow rate measured by ultrasonic flow rate measuring unit 9.

In addition, ultrasonic flow rate measuring unit 9 and flow passage member 10 are configured to be supported by supporting member 11 and to be held by a holder provided on edges of upper case 2 and lower case 3 (for example, refer to Japanese Patent Unexamined Publication No. 2015-148529).

In this case, after a gas indicated with arrows flows in from entrance pipe 4 and diffuses in an internal space of the gas meter through shut-off valve 6, the gas flows into ultrasonic flow rate measuring unit 9 and flow passage member 10 to reach exit pipe 5 via connection pipe 7.

Although a method, in which ultrasonic wave propagation time is used, is used as a flow rate measuring method for ultrasonic flow rate measuring unit 9 in the example of the related art, various measuring methods, such as a thermal system and a fluidic system, can be used.

However, in gas meter 1 of the related art disclosed in Japanese Patent Unexamined Publication No. 2015-148529, there are problems that a large space for accommodation is required and gas meter 1 itself becomes large since ultrasonic flow rate measuring unit 9 and flow passage member 10 are configured to be separated from each other and to be connected to connection pipe 7.

In addition, since ultrasonic flow rate measuring unit 9 and flow passage member 10 are separated away from each other, the flow of a gas flowing into each of the ultrasonic flow rate measuring unit and the flow passage member is not in the same state at all times, and the flow rates of the gas differ in some cases. Therefore, there is a problem that a flow rate is not accurate even when the flow rate measured by ultrasonic flow rate measuring unit 9 is doubled.

In a case where ultrasonic flow rate measuring unit 9 is included as flow passage member 10 to measure a flow rate, the flow rates of a gas flowing differ. For example, in a case where a flow rate of a gas flowing in flow passage member 10 is lower than a flow rate of a gas flowing in ultrasonic flow rate measuring unit 9, a maximum flow rate that can be measured by the gas meter is lower than twice a maximum flow rate that can be measured by one ultrasonic flow rate measuring unit 9. Therefore, there are problems that the maximum flow rate that can be measured by one ultrasonic flow rate measuring unit 9 is required to be made higher than one half of a maximum measurable flow rate required for the gas meter to measure, and ultrasonic flow rate measuring unit 9 becomes needlessly large.

In addition, supporting member 11 for supporting ultrasonic flow rate measuring unit 9 and flow passage member 10 is required, and there is a problem in terms of manufacturing man-hours or costs.

SUMMARY OF THE INVENTION

An object of the disclosure is to provide a gas meter that can be miniaturized when a plurality of the same flow rate measuring units are included.

According to an aspect of the disclosure, a gas meter includes a meter entrance that allows a fluid to flow in, a meter exit that allows the fluid to flow out, and a flow rate measurer that measures a flow rate of the fluid. In addition, the flow rate measurer includes a plurality of flow rate measuring units of a same shape composed of a flow passage portion having a rectangular cross sectional shape on the outer side and a sensor portion disposed on one face of the flow passage portion. The plurality of flow rate measuring units are integrally configured by bonding faces having no sensor portion as bonding faces of the flow rate measuring units.

Accordingly, the flow rate measurer that can measure a high flow rate can be miniaturized, and it is possible to make the gas meter itself compact.

DESCRIPTION OF EMBODIMENTS

Hereinafter, embodiments of a gas meter according to the disclosure will be described with reference to the drawings. The same configuration elements will be assigned with the same reference marks. Already described configuration elements will not be repeatedly described. The disclosure is not limited by the embodiments to be described below.

First Embodiment

Figure 1:
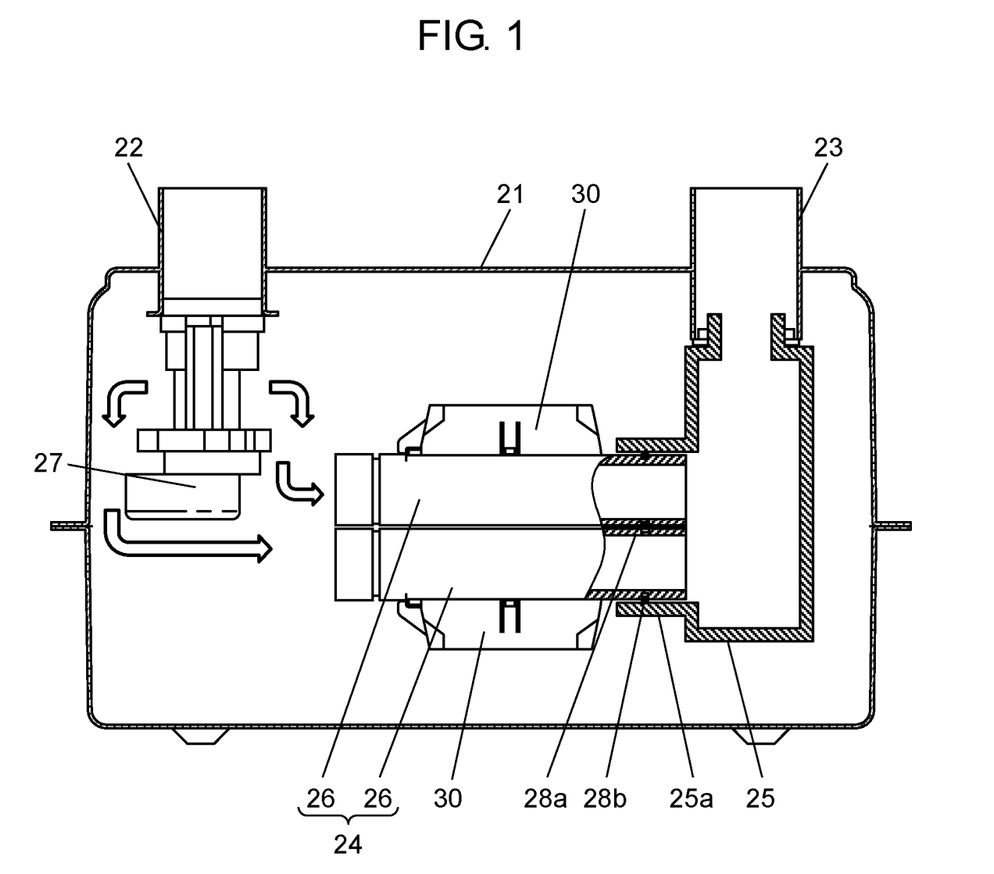
FIG. 1 is a schematic sectional view of a gas meter according to a first embodiment of the disclosure.

FIG. 1 is a schematic sectional view of the gas meter. As illustrated in FIG. 1, gas meter 21 is configured with meter entrance 22, meter exit 23, flow rate measurer 24, and connecting member 25. Flow rate measurer 24 is configured such that back faces (faces on a side opposite to faces on which sensor portions 30 to be described later are disposed) of two flow rate measuring units 26 are integrally bonded together as bonding faces. Connecting member 25 is provided with mounting portion 25a, and is configured such that an outlet of flow rate measurer 24 can be inserted and held.

In addition, in order to secure a seal between meter exit 23 and the outlet end of the flow rate measurer 24, that is, in order to make sure that a gas, which does not pass through flow rate measurer 24, does not flow into connecting member 25, a first seal member 28a is provided between two flow rate measuring units 26, and a second seal member 28b is provided between an outer periphery of the outlet end of the flow rate measurer 24 and an inside surface of the mounting portion 25a of connecting member 25.

In addition, in order to secure a seal between meter exit 23 and flow rate measurer 24, that is, in order to make sure that a gas, which does not pass through flow rate measurer 24, does not flow into connecting member 25, seal member 28a is provided between two flow rate measuring units 26, and seal member 28b is provided between an outer periphery of the flow rate measurer and an inside of mounting portion 25a of connecting member 25.

Shut-off valve 27 for controlling inflow of a gas is connected to meter entrance 22. A configuration where a gas flows into the gas meter when the valve is open and shut-off valve 27 is closed to block a gas in a case where an abnormality has occurred is adopted.

Figure 2A:
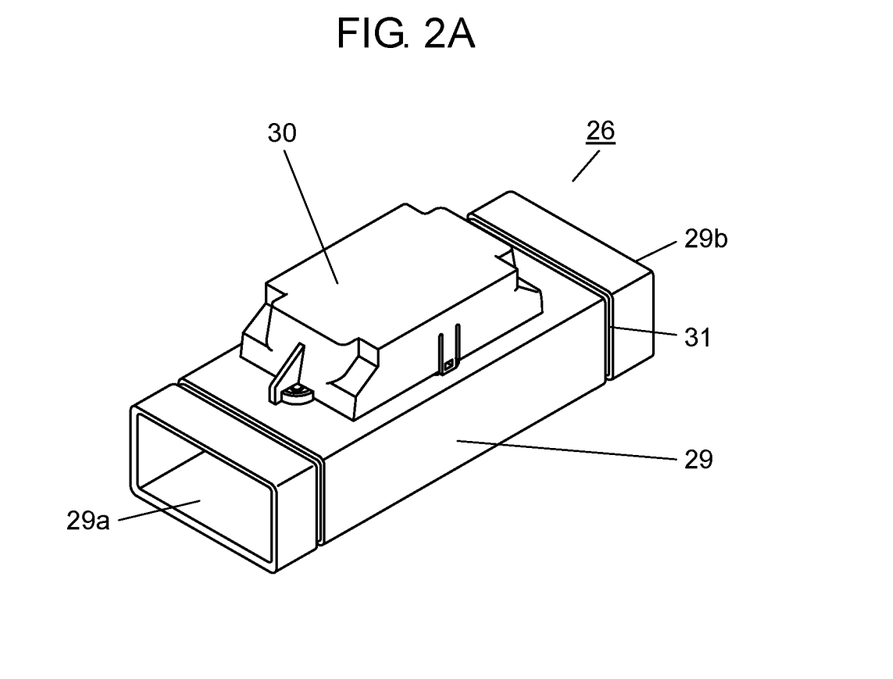
FIG. 2A is a perspective view of a flow rate measuring unit included in the gas meter according to the first embodiment of the disclosure.
Figure 2B:
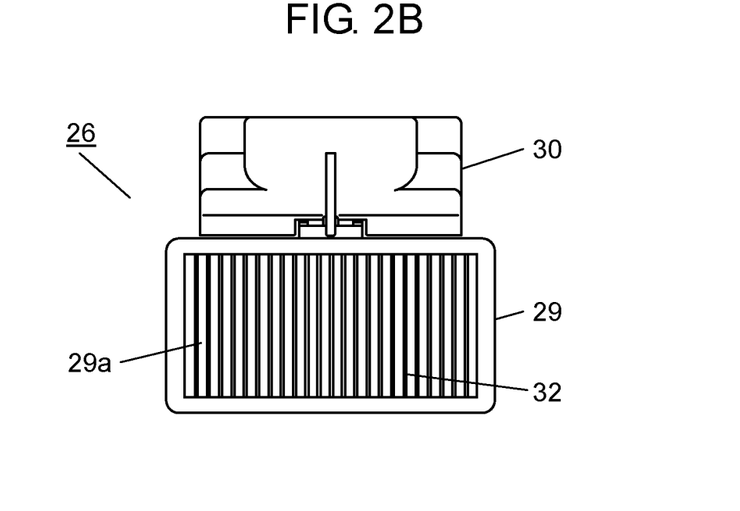
FIG. 2B is a front view of an entrance of the flow rate measuring unit included in the gas meter according to the first embodiment of the disclosure.

FIG. 2A is a schematic perspective view of flow rate measuring unit 26, and FIG. 2B is a front view of flow rate measuring unit 26 seen from entrance 29a. As illustrated in FIGS. 2A and 2B, flow rate measuring units 26 each are configured with flow passage portion 29, in which a gas that is a measuring target flows, and sensor portion 30, in which a sensor and a circuit board for measuring a flow rate are mounted. After a gas, which is a measuring target, flows from entrance 29a into flow passage portion 29 and sensor portion 30 measures a flow rate, the gas flows out from exit 29b to connecting member 25 described above. In the embodiment, ultrasonic waves are used in a flow rate measuring method for sensor portions 30, and an inside of each of flow passage portions 29 is divided into a plurality of flow passages by a plurality of partition plates 32 in order to improve a measuring accuracy.

Seal members 28a and 28b illustrated in FIG. 1 are disposed in grooves 31 provided over entire peripheries of exits of flow passage portions 29 of flow rate measuring units 26.

Herein, a method of measuring a flow rate of a gas in flow rate measuring units 26 will be described.

Figure 3:
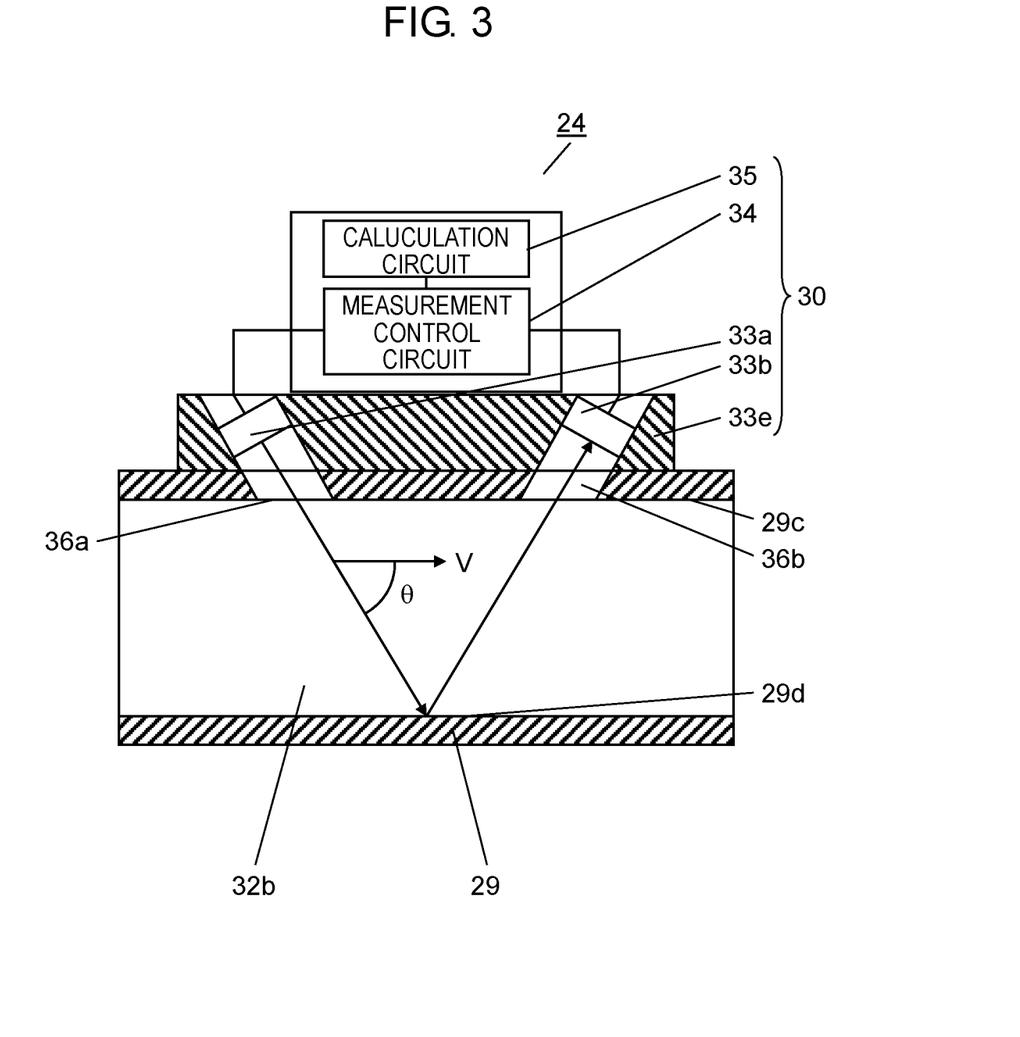
FIG. 3 is a schematic block diagram of the flow rate measuring unit included in the gas meter according to the first embodiment of the disclosure.

FIG. 3 is a block diagram of flow rate measuring unit 26. Flow rate measuring units 26 each are configured to measure a flow rate by using ultrasonic waves. As illustrated in FIG. 3, each of sensor portions 30 transmits and receives ultrasonic waves by using first ultrasonic wave transceiver 33a disposed on an upstream side and second ultrasonic wave transceiver 33b disposed on a downstream side. In addition, each sensor portion includes measurement control circuit 34, which switches between transmission and reception of first ultrasonic wave transceiver 33a and second ultrasonic wave transceiver 33b, outputs a transmission signal or receives a reception signal, and measures propagation time, and calculation circuit 35, which calculates a flow speed or a flow rate based on propagation time. The measurement control circuit and the calculation circuit are mounted on sensor block 33e.

Upper faces 29c of flow passage portions 29 each have first ultrasonic wave transmission window 36a and second ultrasonic wave transmission window 36b.

First ultrasonic wave transmission window 36a and second ultrasonic wave transmission window 36b may be formed of a material allowing ultrasonic waves to be transmitted, or may be openings through which ultrasonic waves are transmitted. In a case where first ultrasonic wave transmission window 36a and second ultrasonic wave transmission window 36b are formed of a material allowing ultrasonic waves to be transmitted, it is sufficient that a difference between the acoustic impedance of an incident face and the acoustic impedance of a transmitting face is smaller than a value determined in advance. A portion of each of upper faces 29c of flow passage portions 29, other than first ultrasonic wave transmission window 36a and second ultrasonic wave transmission window 36b, may be covered with, for example, a panel. Lower faces 29d of flow passage portions 29 each are configured to act as a reflecting face of ultrasonic waves.

Hereinafter, a principle of measuring a flow rate by using ultrasonic waves will be described with reference to FIG. 3.

A flow speed of a fluid flowing in flow passage portion 29 is set as V, a sound speed in the fluid is set as C, an angle between a direction where the fluid flows and an ultrasonic wave propagation direction where lower face 29d reflects ultrasonic waves is set as θ. In addition, an effective length of a propagation path that propagates ultrasonic waves between first ultrasonic wave transceiver 33a and second ultrasonic wave transceiver 33b is set as L.

Measurement control circuit 34 controls transmission of ultrasonic waves from first ultrasonic wave transceiver 33a and reception of ultrasonic waves by second ultrasonic wave transceiver 33b. Propagation time t1 until ultrasonic waves transmitted from first ultrasonic wave transceiver 33a reach second ultrasonic wave transceiver 33b is expressed as the following equation.

$$t1 = L/(C + V \cos \theta) \quad (1)$$

Measurement control circuit 34 controls transmission of ultrasonic waves from second ultrasonic wave transceiver 33b and reception of ultrasonic waves by first ultrasonic wave transceiver 33a. Propagation time t2 until ultrasonic waves transmitted from second ultrasonic wave transceiver 33b reach first ultrasonic wave transceiver 33a is expressed as the following equation.

$$t2 = L/(C - V \cos \theta) \quad (2)$$

When sound speed C of a fluid is eliminated from Equation (1) and Equation (2), the following equation is obtained.

$$V = (L/(2 \cos \theta)) \times ((1/t1) - (1/t2)) \quad (3)$$

As understood from Equation (3), when L and θ are known, measurement control circuit 34 acquires flow speed V based on measured propagation time t1 and propagation time t2. Calculation circuit 35 calculates flow speed V.

In addition, calculation circuit 35 calculates flow rate Q by multiplying flow speed V by flow passage sectional area S of flow passage portion 29 and coefficient K tested in advance, as expressed in the following equation.

$$Q = K \times V \times S \quad (4)$$

Although a so-called V-path flow rate measurement principle is described in the example described above, this is merely an example. So-called Z-path and I-path measurement principles may be used.

In addition, a flow rate measuring system is not required to be an ultrasonic wave system, and a known measuring device can be used. The known measuring device may be a thermal flow sensor that measures a flow rate, for example, by using heat movement by flow. Since the device is known, description thereof will not be repeatedly given.

With the configuration described above, flow rate measuring units 26 each can measure the flow rate of a gas, which is a fluid flowing in flow passage portion 29 thereof.

Flow rate measuring units 26 according to the embodiment can measure, for example, a flow rate of at least 10 cubic meters per hour, more preferably, a flow rate from 15 cubic meters per hour to 30 cubic meters per hour. A general household flow rate measuring unit measures at most approximately 6 cubic meters per hour. Therefore, in facilities for business purposes, a relatively high flow rate can be measured. However, flow rate measuring units 26 according to the embodiment may be used in general households.

As described above, even when the plurality of flow rate measuring units 26 having the same shape according to the embodiment are included, flow rate measurer 24 can be miniaturized, and gas meter 21 itself can be designed to be compact.

In addition, since the flow of a gas in the embodiment is as indicated with arrows illustrated in FIG. 1 and two flow rate measuring units 26 are close to each other compared to the example of the related art, a bias in the flow rate of a gas flowing into two flow rate measuring units 26 disappears. Therefore, a maximum measurable flow rate of one flow rate measuring unit 26 can be made one half of a maximum measurable flow rate required for the gas meter. It is not required to make flow rate measuring units 26 needlessly large, thereby achieving the miniaturization of gas meter 21.

Even in a case where the sensor portion is mounted on only one flow rate measuring unit as in the example of the related art, it is possible to measure a total flow rate by doubling a flow rate measured by the one flow rate measuring unit 26.

In addition, also a flow passage member for connecting flow rate measuring units 26 is unnecessary, and thus there is an advantage in terms of manufacturing man-hours or costs.

Next, various forms of combinations of flow rate measuring units 26 configuring flow rate measurer 24 or disposition with respect to an inflow direction of a gas from the meter entrance will be described.

Figure 4:
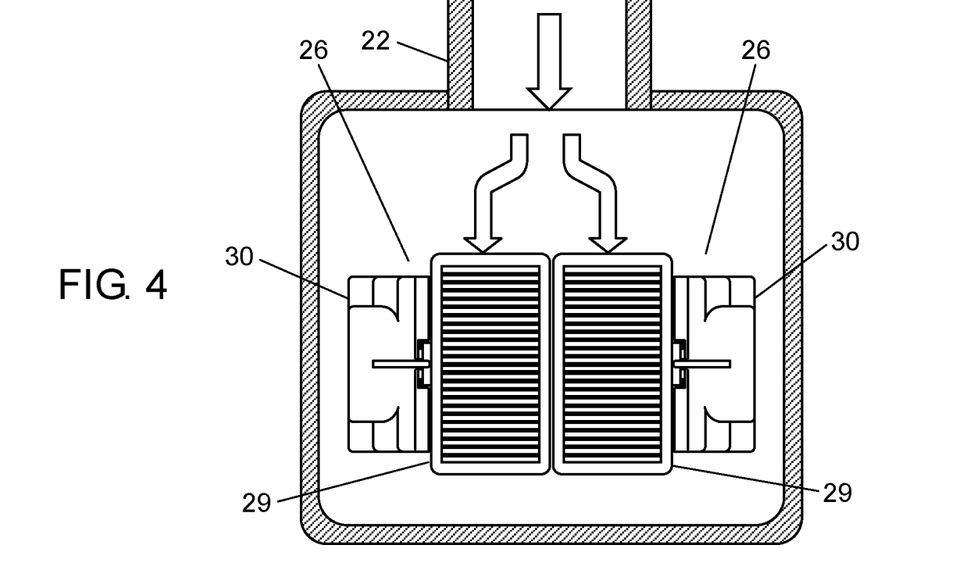
FIG. 4 is a schematic sectional view illustrating an example of another combination of the flow rate measuring units included in the gas meter according to the first embodiment of the disclosure.

In FIG. 4, back faces of two flow rate measuring units 26 are bonded together with respect to an inflow direction of a gas, which is indicated with an arrow. In other words, faces of flow passage portions 29 configuring flow rate measuring units 26, which are opposite to faces on which sensor portions 30 are disposed, that is, the faces of flow passage portions 29, on which sensor portions 30 are not provided, are bonded together as bonding faces. FIG. 4 illustrates a state where two flow rate measuring units 26 are disposed in a right-and-left direction with respect to the inflow direction of a gas, and flow rates of a gas flowing into two flow rate measuring units 26 can be made the same.

Figure 5:
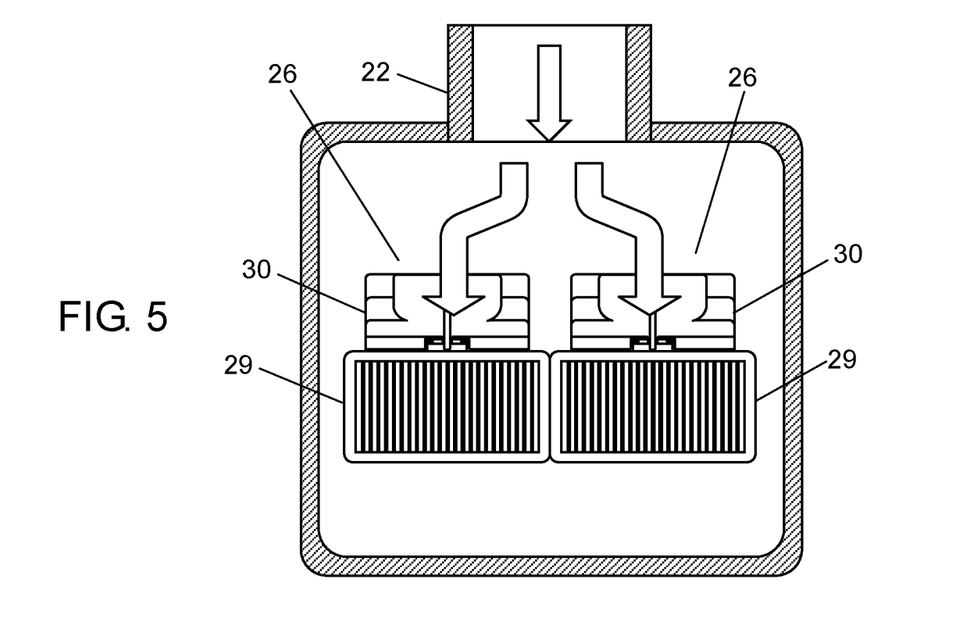
FIG. 5 is a schematic sectional view illustrating an example of still another combination of the flow rate measuring units included in the gas meter according to the first embodiment of the disclosure.

FIG. 5 illustrates a state where side faces of two flow rate measuring units 26, that is, faces of flow passage portions 29, on which sensor portions 30 are not provided, are bonded together as bonding faces with respect to an inflow direction of a gas indicated with an arrow, and are disposed in the right-and-left direction with respect to the inflow direction of a gas. Even in this configuration, flow rates of a gas flowing into two flow rate measuring units 26 can be made the same as in the configuration illustrated in FIG. 4.

Figure 6:
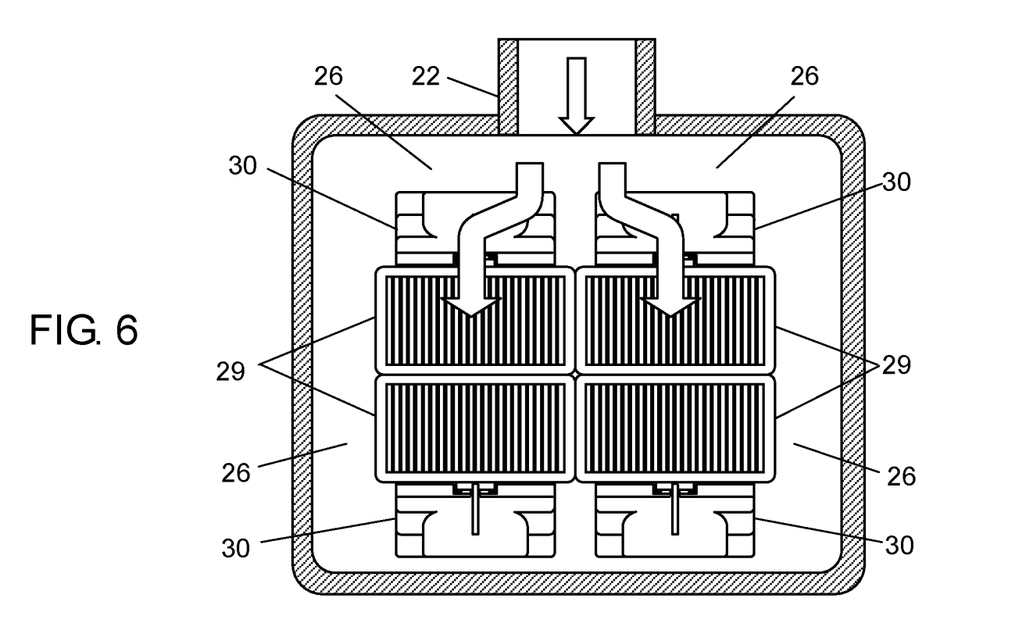
FIG. 6 is a schematic sectional view illustrating an example of still another combination of the flow rate measuring units included in the gas meter according to the first embodiment of the disclosure.

FIG. 6 illustrates that the flow rate measurer is configured with four flow rate measuring units 26 such that side faces of two sets of bonded flow rate measuring units, each of which is formed by bonding the back faces of two flow rate measuring units 26 together, are bonded together with respect to an inflow direction of gas indicated with an arrow. An example of a case where a gas meter which can measure a high flow rate, compared to the case of two flow rate measuring units 26, by using four flow rate measuring units 26, is given. Even in the configuration of FIG. 6, faces of flow passage portions 29 of four flow rate measuring units 26, on which sensor portions 30 are not provided, are bonded together as bonding faces.

Figure 7:
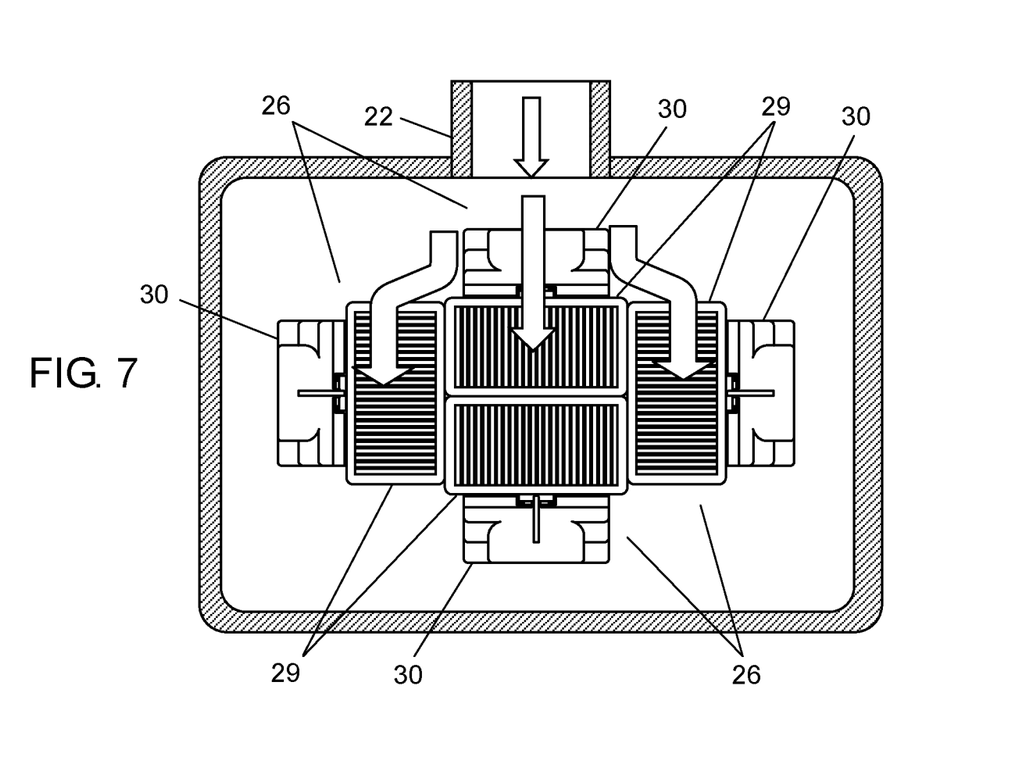
FIG. 7 is a schematic sectional view illustrating an example of still another combination of the flow rate measuring units included in the gas meter according to the first embodiment of the disclosure.

FIG. 7 illustrates an example of a gas meter which can measure a high flow rate with, in total, four flow rate measuring units by bonding back faces of two flow rate measuring units 26 together with respect to an inflow direction of a gas indicated with an arrow and bonding back faces of other flow rate measuring units 26 to right and left side faces of the bonded flow rate measuring units. In the case of this form, a sectional shape of a measured flow passage of the flow rate measuring unit has a lateral dimension which is twice a longitudinal dimension. Even in the configuration of FIG. 7, faces of flow passage portions 29 of four flow rate measuring units 26, on which sensor portions 30 are not provided, are bonded together as bonding faces.

In addition, in this case, the flow of a gas flowing into flow rate measuring units 26 is a combination of longitudinal flow and lateral flow. Therefore, even when there is turbulence in the flow of the gas, a total flow rate can be uniformized by adding flow rates measured by four flow rate measuring units 26. Accordingly, it is possible to stably measure a flow rate.

Although not illustrated, in a case where three flow rate measuring units 26 are included, the disclosure can be realized by removing any one of right or left flow rate measuring unit 26 in FIG. 7.

As described above, in the embodiment, even in a case where flow rate measurer 24 is configured by combining the plurality of flow rate measuring units 26, the shape of the exit is a substantially square. Therefore, it is sufficient that the seal members are disposed between overlapping faces of flow rate measuring units 26 and the outer periphery of flow rate measurer 24 respectively. Accordingly, sealing can be easily carried out.

Second Embodiment

Figure 8A:
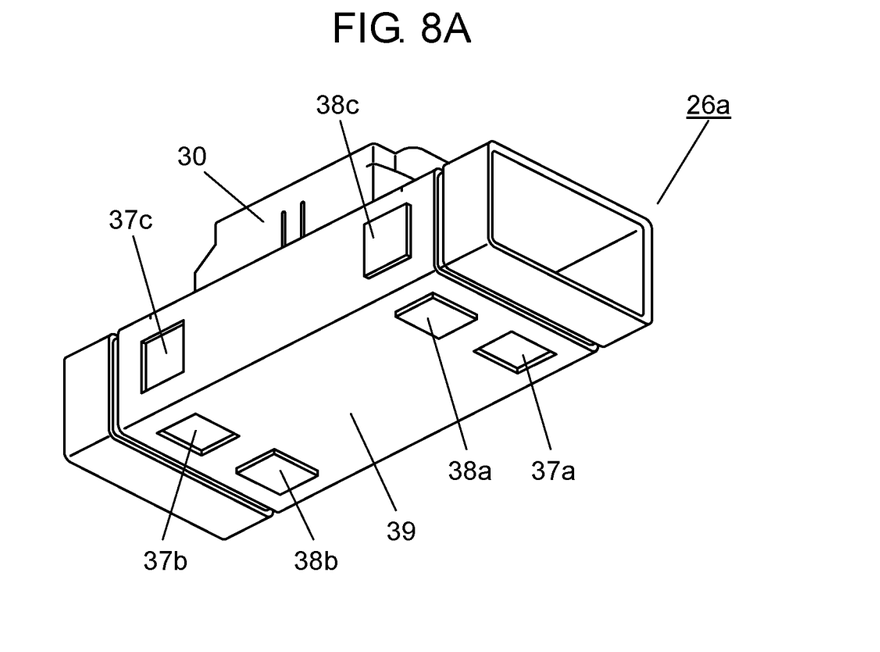
FIG. 8A is a perspective view of a flow rate measuring unit included in a gas meter according to a second embodiment of the disclosure.
Figure 8B:
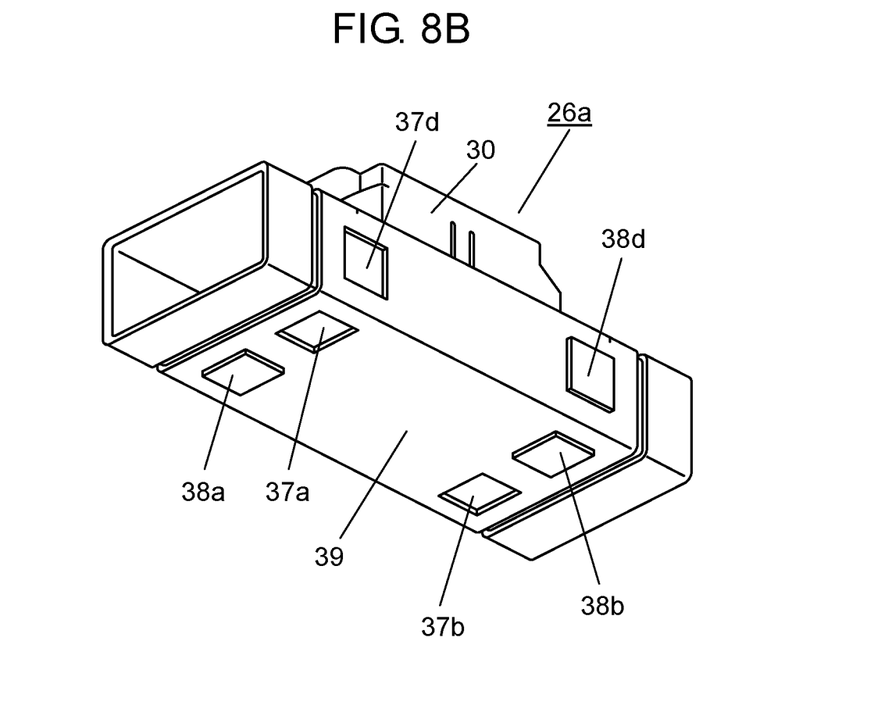
FIG. 8B is a perspective view of the flow rate measuring unit included in the gas meter according to the second embodiment of the disclosure.

FIGS. 8A and 8B are perspective views of a flow rate measuring unit according to a second embodiment of the disclosure. In FIGS. 8A and 8B, engaging portions 38a to 38d and engaged portions 37a to 37d, which allow flow rate measuring units 26a to be engaged with each other, are included in a lower face and side faces of each of flow rate measuring units 26a.

Engaging portions 38a to 38d are formed as protruding rectangular parallelepiped projections, engaged portions 37a to 37d are formed as sunken recessions that can be engaged with projections, which are engaging portions 38a to 38d, and the engaging portions and the engaged portions are alternately disposed as illustrated in FIGS. 8A and 8B.

Since engaging portions 38a to 38d and engaged portions 37a to 37d are disposed in this manner, it is possible to configure the joining of the flow rate measuring units illustrated in FIGS. 4 to 7 by using one type of flow rate measuring unit 26a.

As described above, according to the embodiment, it is possible to bond the flow rate measuring units without using an engaging member by combining one type of two to four flow rate measuring units 26a.

Even in the embodiment, faces of flow passage portions 39 of the plurality of flow rate measuring units 26a, on which sensor portions 30 are not provided, are bonded together as bonding faces, and engaging portions 38a to 38d and engaged portions 37a to 37d are disposed in the faces of flow passage portions 39, on which sensor portions 30 are not provided.

As described above, the disclosure includes the meter entrance allowing a fluid to flow in, the meter exit allowing the fluid to flow out, and the flow rate measurer measuring a flow rate of the fluid. In addition, the flow rate measurer includes the plurality of flow rate measuring units of a same shape, and each flow rate measuring unit being composed of the flow passage portion having a rectangular cross sectional shape on the outer side and the sensor portion disposed on one face of the flow passage portion. The plurality of flow rate measuring units are integrally configured by bonding faces having no sensor portion as bonding faces of the flow rate measuring units. According to this configuration, even when the plurality of measuring units are included, it is possible to miniaturize a flowmeter that can measure a high flow rate, and a wide range of a flow rate can be measured due to the number of the measuring units.

In the disclosure, a first seal member may be disposed on each of the bonding faces. According to this configuration, it is possible to easily carry out sealing since the bonding faces are configured with planar faces.

In addition, the groove 31 may be formed around in the entire periphery of the flow rate measuring units, the groove including a first groove portion on the bonding face and a second groove portion that is other than the first groove portion. The first seal member is disposed in the first groove portion to bond the plurality of flow rate measuring units and to configure the flow rate measurer, a second seal member is provided in the second groove portion, and the second seal member is secured as a seal between the meter exit and the flow rate measurer. According to this configuration, an efficient seal configuration can be realized by using the grooves provided over the entire peripheries.

In addition, in an outline dimension of each of the flow rate measuring units, a ratio between a short side of a rectangular sectional face of the each of the flow rate measuring units and a long side of the rectangular sectional face can be set to 1:2 and the flow rate measuring units are combined to ensure that the measurer has a rectangular sectional shape. According to this configuration, it is possible to dispose the flow rate measuring units both longitudinally and laterally, and an effect of the inflow direction of a gas on flow measurement can be alleviated.

In addition, each of the flow rate measuring units may have an engaging portion on the bonding face, the engaging portion that allows the bonding faces to be engaged with each other.

INDUSTRIAL APPLICABILITY

The gas meter according to the disclosure allows a required number of flow rate measuring units to be easily joined to each other according to a required level of a measured flow rate, and can be applied to a wide variety of purposes in which a high flow rate is required to be measured, such as a large-scale gas meter for business purposes.

REFERENCE MARKS IN THE DRAWINGS 1, 21 GAS METER
22 METER ENTRANCE
23 METER EXIT
24 FLOW RATE MEASURER
26, 26a FLOW RATE MEASURING UNIT
29, 39 FLOW PASSAGE PORTION
30 SENSOR PORTION
37a to 37d ENGAGED PORTION (ENGAGING PORTION)
38a to 38d ENGAGING PORTION

The invention claimed is:

1. A gas meter comprising:
a meter entrance configured to allow a fluid to flow in to the gas meter;
a meter exit that allows the fluid to flow out from the gas meter;
a flow rate measurer configured to measure a flow rate of the fluid through the gas meter; and
a connecting member connecting the meter exit and the flow rate measurer, an outlet end of the flow rate measurer being inserted into the connecting member so that the flow rate measurer is held by the connecting member,
wherein the flow rate measurer includes a plurality of flow rate measuring units of a same shape, each of the flow rate measuring units comprising a flow passage portion having a rectangular cross sectional shape with four longitudinal faces, and a sensor portion disposed on one of the longitudinal faces of the flow passage portion,
wherein the longitudinal faces of the flow passage portion of each of the flow rate measuring units include a bonding face having no sensor portion thereon, all of the plurality of flow rate measuring units being arranged such that bonding faces of the flow rate measuring units are integrally bonded together, wherein each of the flow rate measuring units has a groove on an entire periphery of the flow rate measuring unit, the groove including a first groove portion formed on the bonding face being bonded together and a second groove portion formed on faces other than the bonding face, and wherein a first seal member is arranged in the first groove portion to form a seal between adjoining pairs of flow rate measuring units, and a second seal member is arranged in the second groove portion to form a seal between the flow rate measurer and the connecting member holding the flow rate measurer.

2. The gas meter of claim 1, wherein each of the flow rate measuring units has a rectangular cross-sectional face, a ratio of a length of a short side of the rectangular cross-sectional face of each of the flow rate measuring units and a length of a long side of the rectangular cross-sectional face is 1:2, and the flow rate measuring units are bonded such that the flow rate measurer has a rectangular cross-sectional shape.

3. The gas meter of claim 1, wherein each of the flow rate measuring units includes an engaging portion on the bonding face, the engaging portion being configured to allow the bonding faces of the adjoining flow rate measuring units to be engaged with each other.

4. The gas meter of claim 3, wherein the flow rate measuring units each further include an engaged portion for receiving the engaging portion of an adjoining one of the flow rate measuring units, the engaging portion being a protrusion and the engaged portion being a recess.

5. The gas meter of claim 1, wherein the connecting member has a mounting portion at the outlet end of the flow rate measurer, the outlet end of the flow rate measurer being inserted into and held within the mounting portion of the connecting member such that the second seal member forms a seal between an inner surface of the mounting portion and an outer periphery of the flow passage portion of each of the flow rate measuring units.

6. The gas meter of claim 1, wherein the plurality of flow rate measuring units are arranged to adjoin each other such that bonding faces of each adjoining pair of flow rate measuring units are directly bonded together.

* * * * *